United States Patent [19]

Taylor

[11] Patent Number: 5,662,861
[45] Date of Patent: Sep. 2, 1997

[54] LIQUID EXTRACTION

[75] Inventor: Alan Taylor, Blackburn South, Australia

[73] Assignee: Mincorp Ltd., Victoria, Australia

[21] Appl. No.: 675,518

[22] Filed: Jul. 3, 1996

Related U.S. Application Data

[63] Continuation of Ser. No. 376,154, Jan. 20, 1995, abandoned.

[51] Int. Cl.⁶ .................................................. C22B 13/08
[52] U.S. Cl. .................................................. 266/170; 75/726
[58] Field of Search ........................... 266/170; 75/721, 75/726, 727; 210/513, 634

[56] References Cited

U.S. PATENT DOCUMENTS

| | | | |
|---|---|---|---|
| 4,039,404 | 8/1977 | Richards et al. | 75/726 |
| 4,334,102 | 6/1982 | Decker et al. | 210/634 |
| 4,956,097 | 9/1990 | Courduvelis | 75/726 |
| 5,017,346 | 5/1991 | Spink et al. | 75/726 |

FOREIGN PATENT DOCUMENTS

| | | |
|---|---|---|
| 496286 | 10/1976 | Australia . |
| 84259/75 | 3/1977 | Australia . |
| 87574/75 | 6/1977 | Australia . |
| 74198/87 | 12/1987 | Australia . |
| 36867/78 | 12/1992 | Australia . |

*Primary Examiner*—Scott Kastler
*Attorney, Agent, or Firm*—Merchant, Gould, Smith, Edell, Welter & Schmidt, P.A.

[57] ABSTRACT

Apparatus for liquid extraction is described. The apparatus includes a mixer to which a solvent stream (15) and a feed stream (16) are fed and in which they are mixed to form a flow stream or dispersion. The flow stream is fed to a two-stage settler (17) having a first settling stage (31) and a second settling stage (32). The first settling stage (31) is dimensioned such that primary phase separation occurs in the first settling stage (31), whilst secondary phase separation occurs in the second settling stage (32). The volume of the first settling stage (31) is less than that of the second settling stage (32).

A process for liquid extraction, and a method for retrofitting a conventional mixer-settler are also described.

9 Claims, 4 Drawing Sheets

FIG. 3A
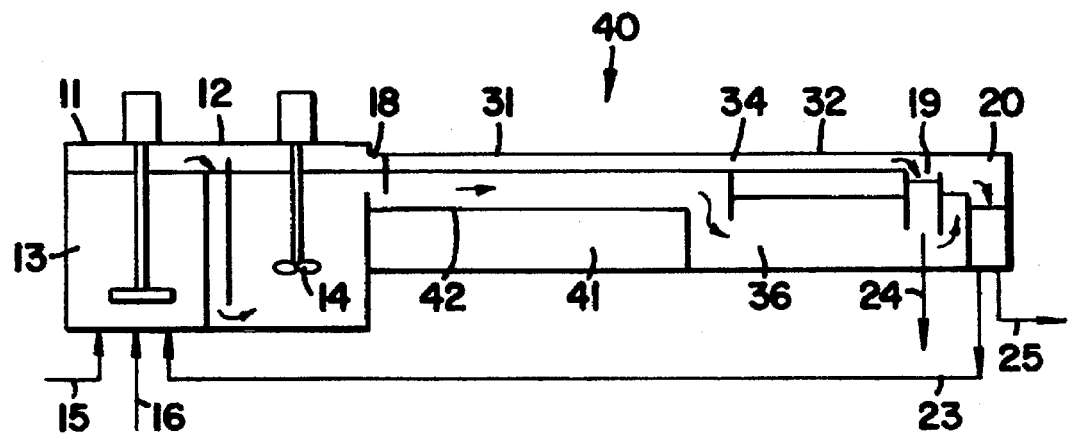
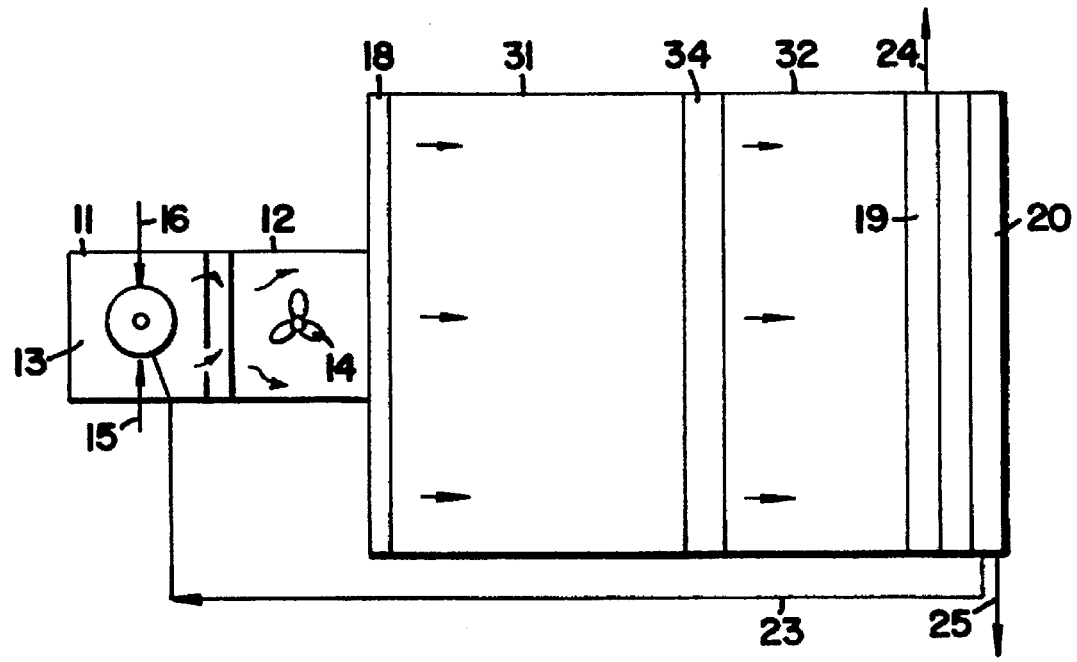
FIG. 3B

LIQUID EXTRACTION

This is a Continuation of application Ser. No. 08/376,154, filed Jan. 20, 1995, now abandoned.

The present invention relates to improvements in or relating to liquid extraction apparatus, and in particular to improvements in mixer-settler type liquid extraction apparatus.

the use of mixer-settlers for the recovery of metals by solvent extraction is common in the extractive metallurgy industry. One such application involves the recovery of copper by solvent extraction from leachant solutions derived from the leaching of copper ores, waste dumps and scrap containing copper.

Solvent extraction of copper is normally followed by the production of high purity copper metal by electrowinning, although copper sulphate or copper powder may also be produced.

Mixer-settlers are also used for the solvent extraction of other metals including uranium, vanadium, nickel, cobalt, rare earths and precious metals such as palladium, and is being considered for the recovery of zinc and gold.

Solvent extraction generally employs the principle of contacting an aqueous metal-bearing stream with an organic solvent having a specific affinity for the metal(s) of interest over the other elements in solution, to form an extract. The extract is then commonly stripped with one or more aqueous solutions to remove the metal(s). In some applications, the extract is scrubbed with one or more aqueous solutions to remove impurities prior to stripping. The stripped extract may also be contacted with a further aqueous solution to regenerate it in preparation for recycle to the extraction step.

Extraction, scrubbing, stripping, and regeneration are commonly carried out in one of more mixer-settlers. Each mixer-settler normally comprises a mixer having one or more mixing boxes in series in which the aqueous metal-bearing stream and organic solvent are intimately contacted to form a flow stream and to bring about the required mass transfer, followed by a settler, in which mechanical separation by gravity of the organic and aqueous phases into extract (or organic phase) and raffinate (or aqueous phase) layers is carried out.

In some cases, a proportion of one of the separated phases is recycled to the mixing boxes after disengagement, so as to control the phase ratio. Copper solvent circuits usually contain extraction and stripping sections, although scrubbing is sometimes required.

Conventional mixer-settler arrangements used in, for example, the copper industry, are generally of the forward liquid flow type, that is, the flow of liquid in the settling stage is in a direction away from the mixer unit. A typical arrangement of this type comprises a number of mixing boxes arranged in series, one mixing box normally being equipped with a pump mixing impeller, another being equipped with a standard mixing impeller, to which the feed and solvent streams are sequentially fed and in which they are mixed to form a flow stream in the form or a dispersion. From the mixing boxes the dispersion is transferred to a settler where separation of the dispersion into extract and raffinate phases occurs, namely a generally relatively rapid primary phase separation, followed by the formation of a dispersion band of the two phases and a longer secondary droplet coalescence.

The main problem with this arrangement is that it requires a large inventory of solvent, which in the case of copper recovery results in significant expense due to the relatively high price for the exotic solvents required for copper extraction. In addition, with this arrangement there is a large volume of slow-moving liquid, which is detrimental to high throughout or plant productivity.

Another mixer-settler apparatus of the prior art is of the reverse liquid flow type, that is, the flow of organic/aqueous mixture in the main settling stage is in a direction towards the pump which feeds the settler. This apparatus comprises a plurality of mixing boxes arranged in series followed by a two-level settling tank fed from the end which is furthest from the mixing boxes. The feed is conveyed to the far end of the settling tank by means of a chute either disposed above, or submerged within, the settling tank. The liquid exits the chute into tho body of the settling tank and flows in a direction back towards the mixing boxes as it separates into its phases.

One of the problems with this type of apparatus is that, in order to convey the organic/aqueous mixture from the mixing boxes to the settling tank, a pump is required to raise the mixture to a suitable level. This is typically achieved by providing a conical pump mounted on the agitator shaft of the final mixing box. This means that the mixing impeller at the bottom of the agitator shaft operates at the speed required for the conical pump and cannot be independently optimised. In some cases the speed of the impeller may be excessive, resulting in the risk of higher entrainment of organic in aqueous phase and/or aqueous in organic phase in the settler discharge streams.

The abrupt change in level and/or direction which the organic/aqueous mixture undergoes upon entry into tho main settling stage occasioned by a return flow arrangement may also result in re-mixing of the phases which may have separated in the chute.

Additionally, a two-level configuration severely limits access into the main settling stage for crud removal, clean-up and settler modification. Crud is a chemically, biologically or physically induced deposit which frequently accumulates at the organic/aqueous interface and must be periodically removed to maintain efficient operation.

Furthermore, conventional forward flow mixer-settlers cannot be easily modified to incorporate a construction of the foregoing type due to the different, ie. reverse fluid flow characteristics.

There is therefore a need for a liquid extraction apparatus and process in which the solvent inventory is able to be reduced, and which is applicable to conventional forward flow mixer-settler arrangements.

Accordingly the present invention provides in one embodiment a forward flow mixer-settler apparatus, said apparatus including a mixer to which a feed stream and a solvent stream are and in which they are mixed to form a flow stream, and a settler for phase separation, wherein said settler include first and second settling stages to which the flow stream is sequentially transferred for said phase separation, said first and second settling stages dimensioned such that primary phase separation takes place in said first settling stage and secondary phase separation takes place in said second settling stage, and wherein the volume of said first settling stage is less than the volume of said second settling stage.

The volume of the first settling stage is preferably significantly less than that of the second settling stage.

In another embodiment, the present invention provides a liquid extraction process including the steps of contacting a feed stream with a solvent stream to form a flow stream, and separating the flow stream into extract and raffinate phases in a settler, wherein a primary phase separation step takes place in a first settling stage and a secondary phase separation step takes place in a second settling stage, and wherein the volume of said first settling stage is less than the volume of said second settling stage.

In another embodiment, the invention provides a method for retrofitting a conventional mixer-settler apparatus of the type comprising a mixer to which a feed stream and a solvent stream are fed and in which they are mixed to form a flow stream, and a settler in which phase separation takes place, the method including the steps of creating first and second settling stages in said settler by modifying the volume of the settler at its upstream end, the volume of said first settling stage selected such that primary phase separation takes place in said first settling stage, and wherein secondary phase separation takes place in said second settling stage, the volume of said first settling stage being less than that of said second settling stage.

The invention is predicated on the discovery that solvent inventory can be significantly reduced without sacrificing the quality or extent of phase separation by providing a first settling stage dimensioned to permit sufficient residence time of the flow stream in the first settling stage such that primary phase separation occurs.

The present invention utilises the concept of separating the phase disengagement, that is, the settling process, into its two components, namely the primary phase break, which is carried out in the first settling stage, and secondary phase disengagement or coalescence in the second settling stage. This enables proven agitator systems to be used in the adjoining mixer, there is no alteration to height obviating the need for a pump, and further provides for substantially reduced solvent inventory and/or increases throughput capacity.

In one preferred embodiment, the first settling stage of the mixer-settler apparatus of the present invention includes a shallow launder. The launder preferably has shallower side walls and hence reduced volume resulting in the flow stream moving through the launder at higher velocities than in a conventional settler.

In a conventional settler, primary and secondary phase separation is carried out in a single vessel with a level floor having a side wall height sufficient for secondary coalescence. We have surprisingly found in accordance with the present invention that by separating the settler into two distinct stages of differing volumes, the working capital of a conventional mixer-settler can be significantly reduced. Such cost reduction may at least partly arise from a reduction in the amount of costly organic solvent which is required to operate a mixer-settler according to the preset invention.

A forward flow mixer-settler apparatus according to the present invention may include a distribution arrangement for distributing the flow stream across the settler. Preferably a separate distribution arrangement is positioned near the upstream end of each settling stage. A distribution arrangement according to the present invention may include at least one baffle and/or a skimmer. A baffle according to the present invention may be adapted to vary the velocity of the flow stream.

Most preferably a distribution arrangement includes a skimmer extending across the settler and a baffle arrangement. The skimmer may be constructed and arranged for the flow stream to pass above and/or below the skimmer. Most preferably a skimmer at the upstream end of the second settling stage is adapted and positioned whereby a portion and preferably a majority of the organic layer passes over the skimmer and the remainder passes under the skimmer.

The baffle arrangement may comprise a picket fence or other known arrangement for distributing the flow stream across the settler. A picket fence includes two or more rows of offset upstanding pickets which typically extend across the settler to resist the direct downstream path of the flow stream.

The construction and arrangement is preferably such as to resist the remixing or the stratified layers of the flow stream as the flow stream enters the second settling stage.

Preferably a skimmer arranged at the upstream end of the second settling stage is adapted to remove a portion of the separated organic layer from the flow stream.

The mixer-settler apparatus of the present invention is preferably on one level, thus permitting good access for cleaning and/or modification. This results in the added advantage that the solution surfaces in the first and second settling stages are essentially at the same level, which eliminates the requirement for pumping, thus avoiding the risk of higher organic entrainment, and avoiding the extra power which would be required for pumping.

As noted above, in a preferred aspect the first settling stage where primary phase separation takes place comprises a shallow launder. The launder is suitably dimensioned to provide adequate residence time and sufficient flow velocity to enable the flow stream to undergo primary phase separation in the first settling stage.

To further assist in the understanding of the present invention, particularly preferred embodiments of the invention will now be described in relation to the accompanying drawings.

BRIEF DESCRIPTION OF THE DRAWINGS

In the drawings in which like features are indicated by common numerals:

FIG. 3b is a plan view of the retrofitted mixer-settler of FIG. 3a, FIG. 4a is a sectionised perspective view of a retrofit concept in accordance with one embodiment of the present invention.

In order to understand the advantages of the present invention, the construction of a conventional mixer-settler of the prior art needs to be understood. FIG. 1a illustrates a typical conventional forward flow mixer-settler 10 presently used for the recovery of copper by solvent extraction. In this example, there is depicted a mixer including a pair of mixing boxes 11 and 12 arranged in series, the first equipped with a pump mixing impeller 13 and the second with a standard mixing impeller 14. The number of mixing boxes, their shape and their orientation may be varied according to differing requirements such as contact time, space limitations etc. For example, the settler 17 illustrated comprises a single stage settler of rectangular shape, and it will be understood that it may be cylindrical or some other shape as is known in the art.

Figure 1A:
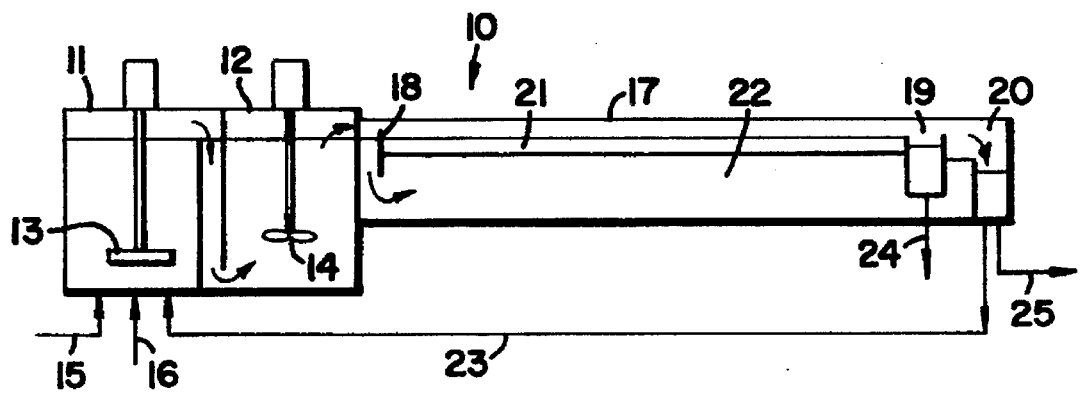
FIG. 1a is a side elevation of a conventional forward flow mixer-settler of the prior art.

A solvent stream 15, suitably an organic extractant stream, and a feed stream 16, suitably an aqueous metal-bearing stream, are fed to the mixer. The two streams are initially at least partly mixed in first mixing box 11 and pass from the overflow of first mixing box 11 to second mixing box 12 to form a flow stream, which is subsequently fed to settler 17. The mixer accordingly effects mixing of the two streams whereby to form a flow stream which is preferably a flow stream of aqueous in organic or vice versa. As it traverses the settler, the flow stream becomes progressively stratified into an extract (or organic phase) layer and a raffinate (or aqueous phase) layer with a dispersion band interposed between the two layers, which eventually coalesces into the two phases.

Settler 17 includes distribution arrangement 18 in the form of a distributor baffle to facilitate distribution of the flow stream into the settler 17. In the embodiment illustrated in FIG. 1A, the distributor baffle comprises a picket fence as is known in the art at or near the settler inlet to regulate the flow of the entering flow stream, to shield the contents of the settler 17 from being excessively disturbed, and to enhance coalescence of the aqueous and organic phases.

The flow stream stratifies as it passes through settler 17 into an upper extract layer 21 and a lower raffinate layer 22 which respectively pass over discharge weirs 19 and 20 from which the extract and raffinate layers are separately discharged via discharge lines 24 and 25. A proportion of the raffinate layer may be recycled via recycle line 23 to the first mixing box 11 to supplement the feed stream 16.

Figure 1B:
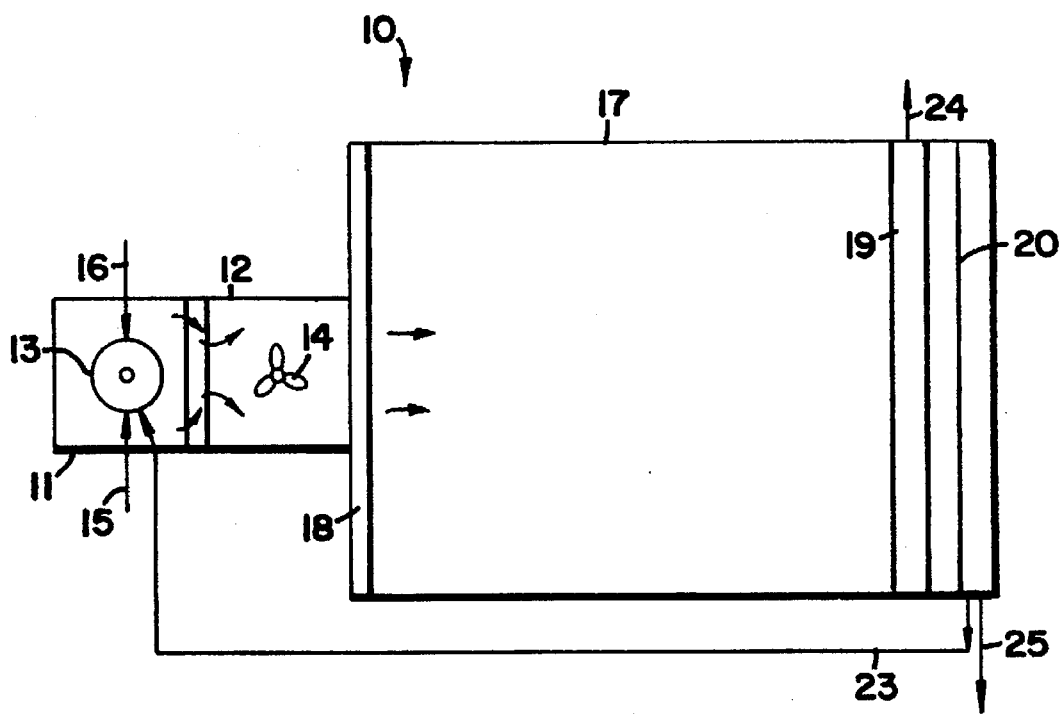
FIG. 1b is a plan view of the prior art mixer-settler of FIG. 1a, FIG. 2a is an example of a mixer-settler apparatus in accordance with one embodiment of the present invention.
Figures 2A, 2B:
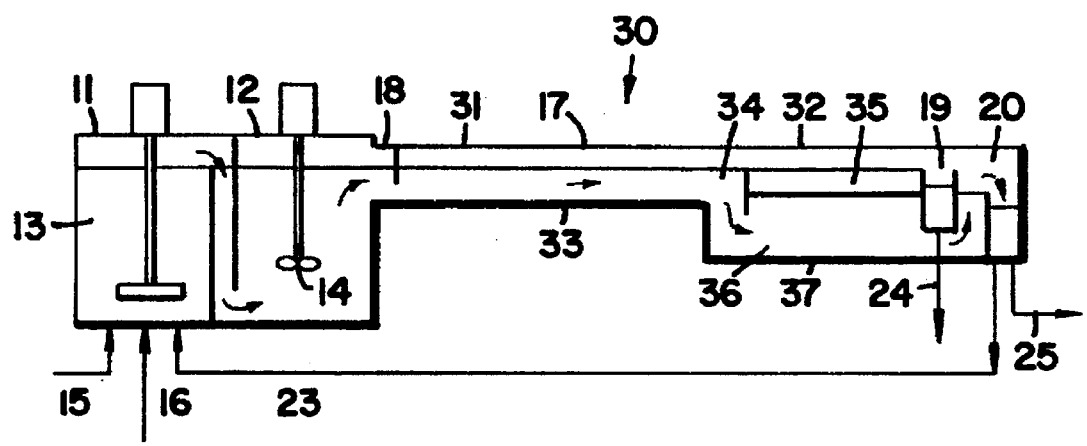
FIG. 2b is a plan view of the apparatus of FIG. 2a, FIG. 3a shows a conventional mixer-settler retrofitted in accordance with one embodiment of the present invention.

Turning to FIGS. 2a and 2b, a mixer-settler apparatus in accordance with one embodiment of the present invention is depicted. Like integers of the conventional mixer-settler of FIGS. 1a and 1b have been given like numbers in the other figures and no further explanation of those integers is required for the purposes of describing the present invention.

Tho two-stage settler 17 of the mixer-settler apparatus 30 of the present invention includes first and second settling stages 31 and 32 respectively. First settling stage 31 includes a floor 33 which is elevated with respect to floor 37 of second settling stage 32.

Second settling stage 32 includes a second distribution arrangement 34 which functions in the form of a weir, by which in one arrangement the separated organic layer 19 is skimmed from the flow stream from the first stage 31 and assists in separation of the flow stream into an organic layer 35 and an aqueous stream 36. In an alternative arrangement the entire flow stream from the first stage 31 passes under the weir in order to promote even distribution across the second settling stage 32 and to minimise turbulence.

It will be appreciated that the depth and hence volume of the flow stream flowing through the first settling stage 31 is significantly reduced with respect to the settler of a conventional mixer-settler construction, and that the flow velocity of the flow stream in the first settling stage 31 will accordingly be higher than the flow velocity in a corresponding section of a conventional mixer-settler.

FIG. 3a illustrates a conventional mixer-settler 40 modified by retrofitting a section 41, which may be modular, and includes a false bottom 42 to significantly reduce the depth and thereby define a shallow launder of reduced volume in the first settling stage 31.

Figure 4A:
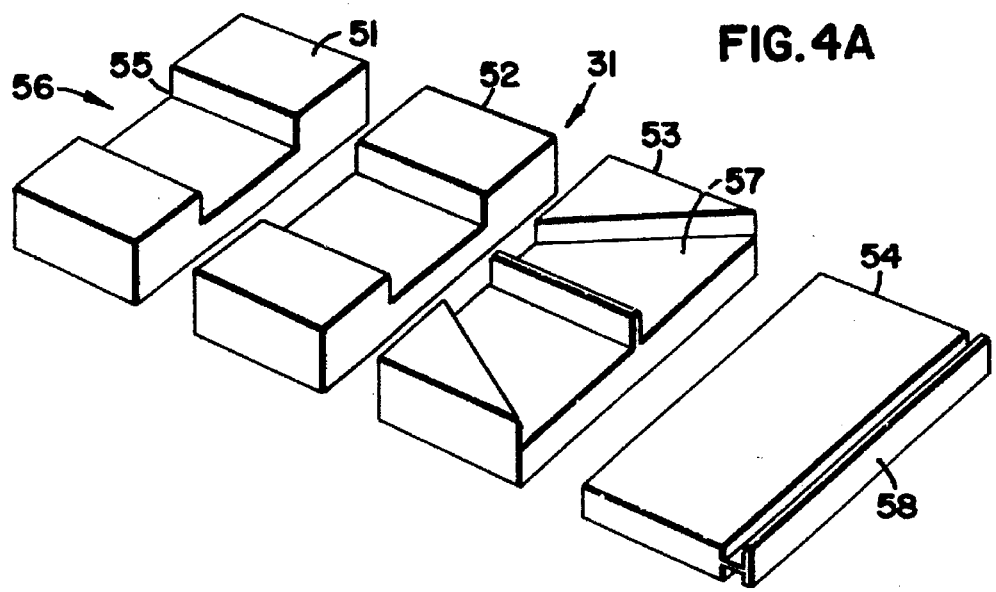
FIG. 4b is a plan view of the mixer-settler of FIG. 4a in assembled condition.
FIG. 4c is an elevation of a distribution arrangement of the embodiment of FIGS. 4a and 4b.
Figure 4B:
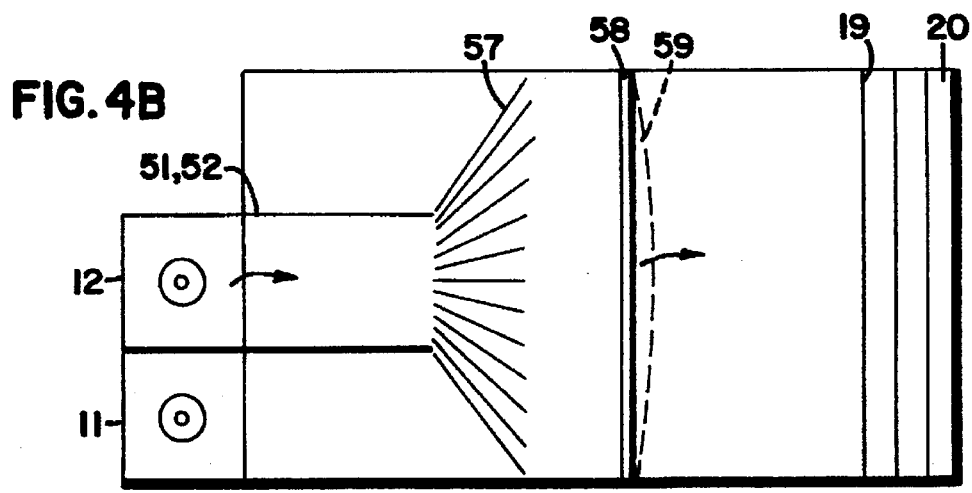

FIG. 4a illustrates a number of shallow sections 51, 52, 53 and 54 defining a first settling stage 31. These sections form modules which can be floated onto the fluid surface of a conventional mixer-settler and sunk to form a shallow first settling stage 31. These sections also include a channel or trough 55 for flow stream or dispersion 56. The width of the channel 55 is preferably the same as the inlet from the mixer (not shown).

Section 53 includes a number of straightening slats 57 to modify the flow behaviour of the dispersion 56. It has been found that this construction assists flow distribution and minimises turbulence.

The sections 51, 52, 53 and 54 can, depending on requirements, be on a platform or on legs. It is also important when retrofitting the sections in the settler of a conventional mixer-settler to ensure that no organic is trapped underneath the retrofitted sections, and in such a case, the bases of the retrofitted sections may form a sloping bottom which will assist in causing the organic to rise up into the second stage settler when the sections are in installed.

Figure 4C:
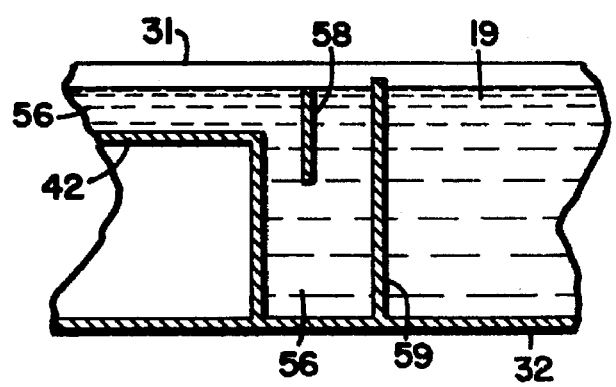

In the embodiment of FIG. 4c, the flow stream distribution arrangement located near the upstream end of the second settling stage 32 includes a skimmer 58 in the form of a weir by which the separated organic layer 19 is skimmed from the top of the dispersion 56 and passes over the skimmer 58, while the balance of the flow stream passes under skimmer 58 as indicated by the arrow. The skimmer 58 may be followed by a picket fence (not shown), if necessary to promote more quiescent conditions.

A second component of distribution arrangement is in the form of a baffle or picket fence 59 located at the commencement of the second settling stage 32 through which both the top extract layer 19 and the lower dispersion 56 including a dispersion band and a raffinate layer pass and subsequently undergo secondary phase separation in the second settling stage 32. The baffle facilitates distribution of the flow stream by regulating the flow of the entering flow stream, to shield the contents of the settler from being excessively disturbed, and to enhance coalescence of the aqueous and organic phases.

It can be seen from the foregoing that the mixer-settler apparatus of the present invention permits primary phase separation to be carried out in a first settling stage. The first settling stage has a volume significantly less than that of the second settling stage. In the embodiment illustrated this is achieved by providing a first settling stage which is both significantly shallower and of a significantly reduced surface area than that of the second settling stage. As a result higher resulting fluid velocities occur in this arrangement than in a conventional mixer-settler arrangement.

The present invention can also be used to readily inexpensively retrofit a conventional mixer-settler to obtain the advantages of the invention, namely a reduced organic inventory or increased throughput. Furthermore, the need for an additional pumping source in the mixing boxes is obviated, which means that the design of the mixing boxes and agitators may be unchanged from the conventional mixer-settler design. The absence of a pumping source in the mixing boxes frees the mixing agitator to be run at optimum speed, reducing the risk of secondary haze formation.

In addition, access to the settler during normal operation for the determination of dispersion depth and removal of crud is comparable to that of a conventional mixer-settler design.

The materials for the modified launder and volume reduction elements of the present invention may be selected on the basis of structural integrity and resistance to corrosion. Various plastics such as HDPE, polypropylene, FRP and metals such as stainless steel are appropriate in most instances.

Due to the potential buoyancy of the sections in the host fluid, they may need to be weighted down, filled with compatible denser fluid or even made of dirigible design. Concrete blocks, rocks, gravel or other similar weighted material may be employed for this purpose. It is also possible to utilise a gravel bed to displace the majority of the first stage volume and place the modified launder on top of the gravel bed.

The retrofit section inserts can be designed for installation without draining the settling stages in order to minimise downtime. Ideally, the sections can be pushed into place without needing attachment to each other, or they may merely be clamped to the settler side walls.

The present invention has the benefit of substantial net savings in solvent inventory. For new installations, equipment size reductions when compared with conventional units can lead to substantial capital cost reductions. In addition to the reduction in organic inventory, a more significant benefit to users of the apparatus and processes of the present invention when applied to an existing conventional mixer-settler apparatus is the potential for an increase in throughput. It is estimated that in many instances settlers are the limiting step to increase capacity of the plant, and with an appropriate retrofit in accordance with the present invention it is estimated the settlers could handle 25% to 50% more flow. In the case of precious metals applications the reduction in inventory has special importance for both the organic and the aqueous phase due to the significant working capital tied up. Thus, the installation of the present invention as a retrofit could lead to a substantial saving.

While it has been convenient to describe the invention herein in relation to particularly preferred embodiments, it is to be appreciated that other constructions and arrangements are also considered as falling within the scope of the invention. Various modifications, alterations, variations and/or additions to the constructions and arrangements described herein are also considered as falling within the scope and ambit of the present invention.

I claim:

1. A forward flow mixer-settler apparatus, said apparatus comprising a mixer to which a feed stream and a solvent stream are fed and in which they are mixed to form a flow stream, and a settler arranged to receive the flow stream overflowing from the mixer into the settler for phase separation, wherein said settler comprises first and second settling stages through which the flow stream continuously and sequentially flows under gravity for said phase separation, said first and second settling stages dimensioned such that primary phase separation of the flow stream into an aqueous layer, a solvent layer and dispersion band interposed therebetween takes place in said first settling stage and coalescence of the dispersion band and separation of the aqueous layer and solvent layer occurs in said second settling stage, and wherein the volume and depth of said first settling stage is less than the volume and depth of said second settling stage.

2. The apparatus according to claim 1, wherein said first settling stage comprises a shallow launder.

3. The apparatus according to claim 2, wherein said shallow launder comprises a plurality of modular sections.

4. The apparatus according to claim 1 further comprising at least one distribution arrangement to distribute the flow of said flow stream across the settler.

5. The apparatus according to claim 4, wherein a distribution arrangement is positioned at the upstream end of said first settling stage.

6. The apparatus according to claim 4, wherein a distribution arrangement is positioned at the upstream end of said second settling stage.

7. The apparatus according to claim 4, wherein said distribution arrangement includes a picket fence for distributing the flow stream across the settler.

8. The apparatus to claim 4, wherein said distribution arrangement includes a skimmer extending across the settler and a baffle arranged to separate the aqueous layer and solvent layer.

9. A single-level forward flow apparatus for liquid extraction, said apparatus comprising a mixer to which an aqueous stream and an organic stream are fed and in which they are mixed to form a dispersion, and a settler arranged to receive a dispersion stream overflowing from the mixer into the settler for phase separation, wherein said settler includes first and second settling stages through which the dispersion stream continuously and sequentially flows under gravity for said phase separation, said first and second settling stages dimensioned such that primary phase separation of the dispersion stream into an aqueous layer, a solvent layer and a dispersion band interposed therebetween takes place in said first settling stage and coalescence of the dispersion band and separation of the aqueous layer and solvent layer occurs in said second settling stage, the volume and depth of said first settling stage being less than that of said second settling stage, wherein said first settling stage includes a shallow launder having a plurality of modular sections constituting said first settling stage, and further including a first distribution arrangement positioned at the upstream end of said first settling stage and a second distribution arrangement positioned at the upstream end of said second settling stage.

* * * * *